United States Patent [19]
Johnson

[11] 4,245,887
[45] Jan. 20, 1981

[54] OPTICAL WAVEGUIDE CONNECTOR

[75] Inventor: Tore R. Johnson, Harrisburg, Pa.

[73] Assignee: AMP Incorporated, Harrisburg, Pa.

[21] Appl. No.: 15,265

[22] Filed: Feb. 26, 1979

[51] Int. Cl.³ .............................................. G02B 5/14
[52] U.S. Cl. ................................................ 350/96.21
[58] Field of Search ..................................... 350/96.21

[56] References Cited
U.S. PATENT DOCUMENTS

| | | | |
|---|---|---|---|
| 3,885,859 | 5/1975 | Dalgleish et al. | 350/96.21 |
| 3,989,567 | 11/1976 | Tardy | 350/96.21 |
| 4,019,241 | 4/1977 | Logan | 350/96.21 |
| 4,047,796 | 9/1977 | Kao et al. | 350/96.21 |
| 4,056,305 | 11/1977 | McCartney et al. | 350/96.21 |
| 4,061,416 | 12/1977 | Stewart | 350/96.21 |
| 4,087,155 | 5/1978 | Deacon | 350/96.21 |
| 4,094,580 | 6/1978 | Cook et al. | 350/96.21 |
| 4,148,559 | 4/1979 | Gauthier | 350/96.21 |
| 4,155,624 | 5/1979 | Logan et al. | 350/96.21 |
| 4,162,821 | 7/1979 | Schumacher | 350/96.21 |

*Primary Examiner*—Stewart J. Levy
*Attorney, Agent, or Firm*—Richard B. O'Planick

[57] ABSTRACT

An optical waveguide connector is disclosed for coupling optical waveguides in colinear coincident axial alignment. The connector comprises two intermateable connector bodies, with each connector body having first and second alignment surfaces which cooperate to define an interstitial space therebetween for receiving a corresponding waveguide. Each first alignment surface extends beyond the end of the corresponding waveguide to engage and laterally urge a corresponding waveguide of the other connector body into lateral engagement with the corresponding first and second cooperating surfaces of the other connector body when the connector bodies are matingly engaged.

12 Claims, 9 Drawing Figures

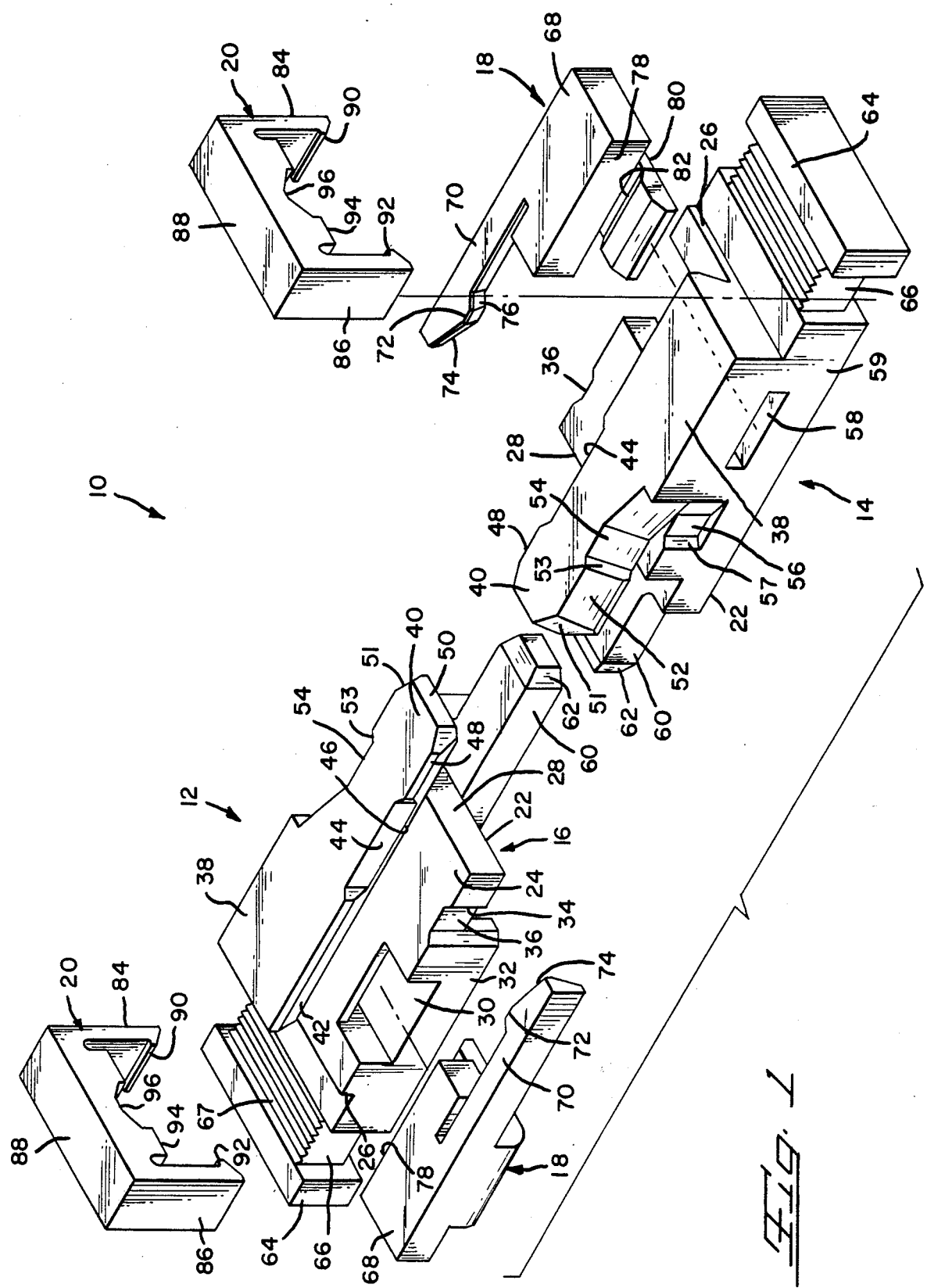

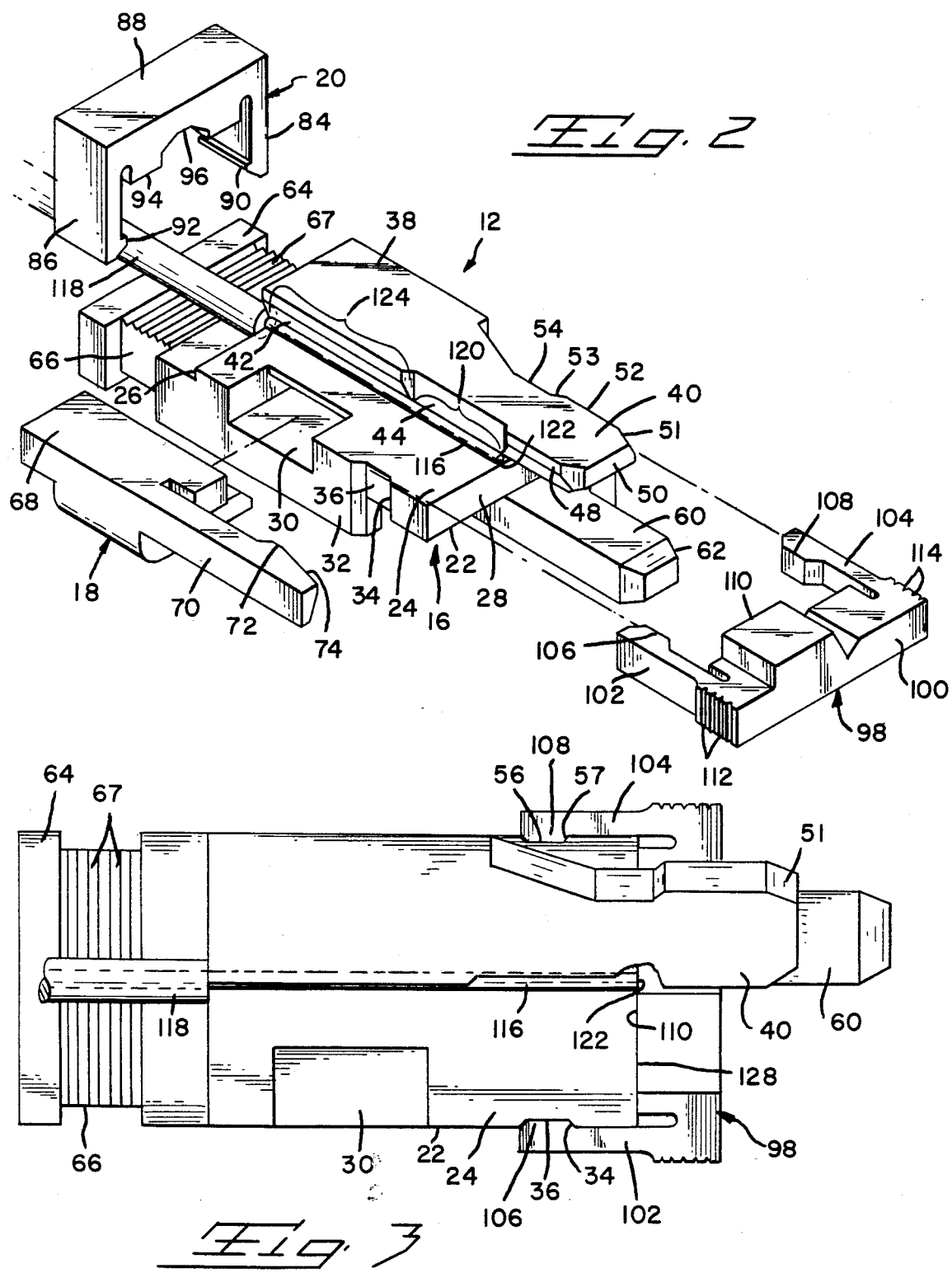

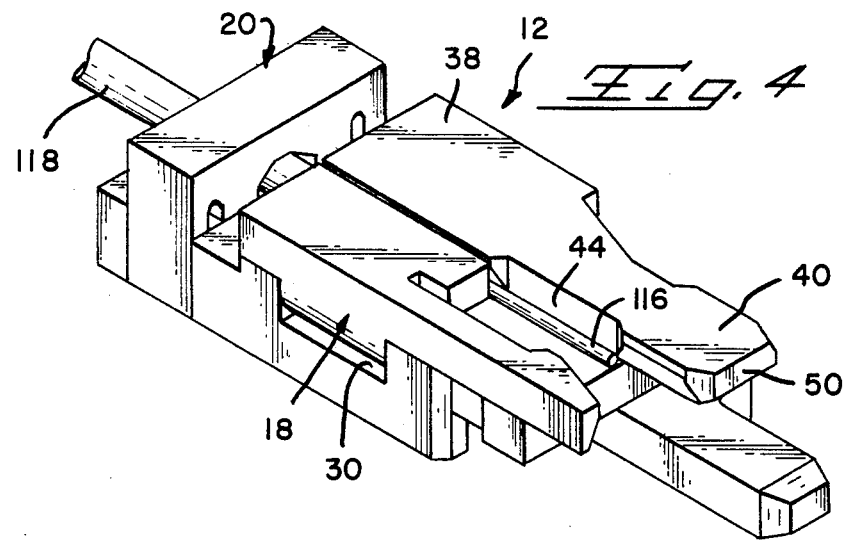
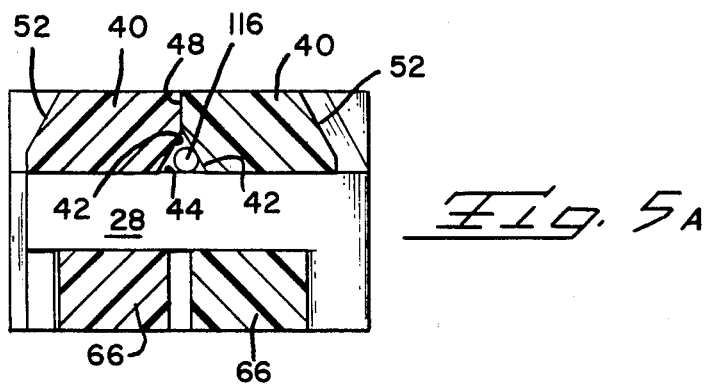
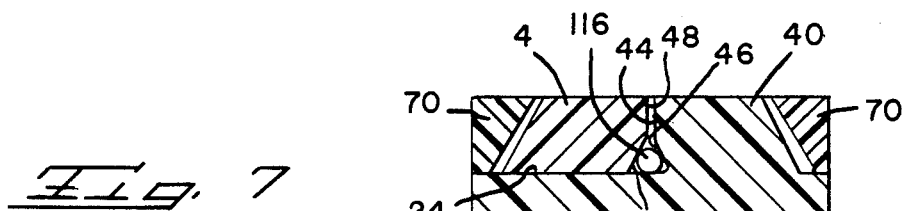
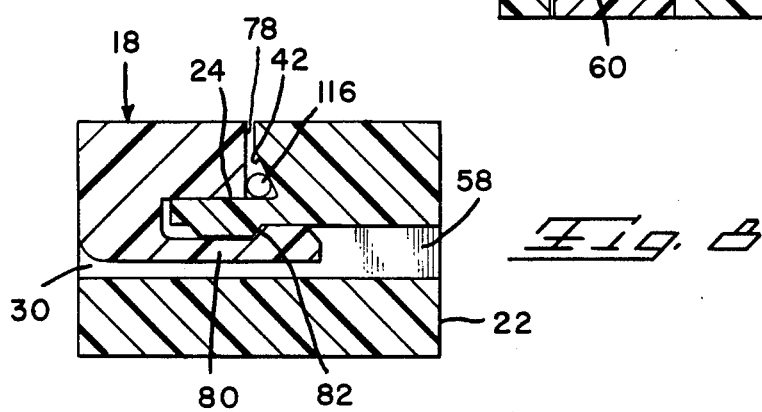

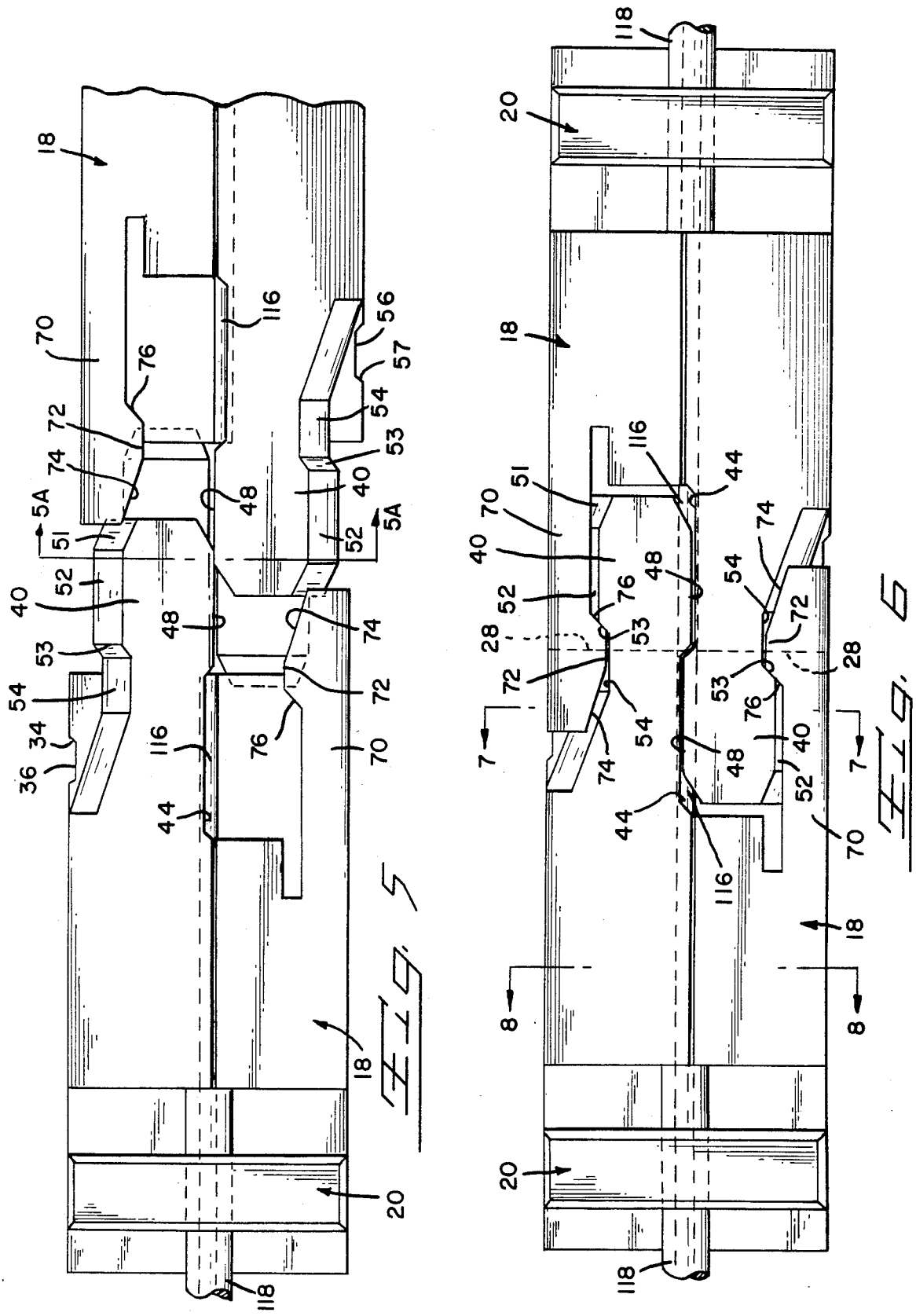

OPTICAL WAVEGUIDE CONNECTOR

BACKGROUND OF THE INVENTION

1. Field of the Invention

This invention relates to optical waveguide connectors and, more specifically, to waveguide connectors of the type utilizing hermaphroditic connector bodies, each having a waveguide receiving passageway therethrough.

2. The Prior Art

Data transmission by the propogation of light waves through an optical waveguide medium, while relatively well-known within the communication industry, has presented a host of technical challenges to those within the electrical industry who are concerned with developing interconnection systems and, in particular, optical connectors for the optical waveguides.

Of special concern has been the achievement of an optical connector capable of optically coupling a pair of waveguides in a positive and dependable manner. The fragile nature of the waveguides, which increases the likelihood of breakage, coupled with the critical mechanical and performance demands placed on an optical connector have heretofore been prohibitive to the attainment of a suitable interconnection device. Specifically, the electrical industry has been in need of an optical connector which could receive a waveguide having a diameter variable within a given range of tolerances, orient the waveguide so that an optimal coupling might be achieved, and effectuate such a coupling with minimum danger to the fragile waveguide. Further requirements placed upon an optical connector is that it be self aligning, of minimal overall size, and that it protect the prepared ends of the waveguides from abrasive stubbing during the mating procedure.

Heretofore, no fiber optical connector had been achieved which could adhere to all of the above set forth performance constraints. One promising connector approach examined by the industry has been the utilization of intermateable connector halves, each of which is provided with three cylindrical rods of equal diameters which are arranged in a longitudinally adjacent configuration. Each three rod configuration defines an elongate interstitial passageway between the rods which is dimensioned to closely receive a single optical fiber therethrough. A connector of this type is disclosed in U.S. Pat. No. 4,087,155. In accordance with this approach, to optically connect two fibers which extend through complimentary connector halves, the two halves are positioned within a cylindrical sleeve member and the corresponding fibers are thereby assumed to be axially aligned with respect to each other.

While this connector works well and has been generally well received by the industry, certain problems attendant upon its use prevent the connector from achieving ideal results in all situations. As mentioned previously, receipt and control of a fiber is difficult because the fiber diameters can vary within a specified range of tolerances. Also, in certain field situations, conditions may exist which can cause misalignment of the connector halves within the cylindrical sleeve and thereby affect the performance characteristics of the coupled waveguides within that sleeve.

SUMMARY OF THE INVENTION

The subject invention involves an optical connector for coupling optical waveguides in coincident axial alignment and comprises matingly engageable hermaphroditic connector bodies. Each connector body is provided with an elongate portion having a waveguide receiving passageway therethrough defined by three inwardly directed surfaces. Each connector body is intended to receive a corresponding waveguide in the passageway, and further includes first and second alignment surfaces cooperating to define an interstitial space open along a length thereof for receiving the corresponding waveguide therein. The first alignment surface extends beyond the end of the corresponding waveguide to engage and laterally support a corresponding waveguide of the other connector body against the corresponding first and second cooperating alignment surfaces of the other connector body when the connector bodies are matingly engaged.

Accordingly, it is an object of the instant invention to provide a fiber optic connector which can achieve positive optical and mechanical coupling of two optical waveguides.

It is a further object to provide a fiber optic connector of the type having a waveguide receiving passageway therethrough which can receive a waveguide having a diameter variable within a range of tolerance limits.

A still further object of the instant invention is to provide a fiber optic connector which can protect the prepared ends of the waveguides to be coupled from abrasive contact against foreign surfaces.

Yet another object of the instant invention is to provide an optical waveguide connector which is comprised of hermaphroditic connector bodies.

Yet another object of the instant invention is to provide an optical waveguide connector which can be economically and readily produced.

These and other objects, which will be apparent to one ordinarily skilled in the art, are achieved by a preferred embodiment of the subject invention which is described in detail below and illustrated in the accompanying drawings.

BRIEF DESCRIPTION OF THE DRAWINGS

FIG. 1 is an exploded perspective view of the subject optical waveguide connector;

FIG. 2 is an exploded perspective view of one hermaphroditic unit of the subject connector shown in FIG. 1 prior to the initiation of the assembly procedure with an optical waveguide in position thereon and a waveguide positioning gauge exploded from the connector unit;

FIG. 3 is a top plan view of the optical connector of FIG. 2 with the waveguide positioning gauge in referencing position;

FIG. 4 is a perspective view of a fully assembled connector unit;

FIG. 5 is a top plan view of the subject optical waveguide connector at the beginning of the mating sequence;

FIG. 5A is a sectional view taken through the line 5A of FIG. 5.

FIG. 6 is a top plan view of the subject optical waveguide connector at the end of the mating sequence;

FIG. 7 is a sectional view taken along the line 7—7 of the subject optical waveguide connector shown in FIG. 6; and FIG. 8 is a sectional view taken along the line 8—8 of the subject optical waveguide connector shown in FIG. 6.

DETAILED DESCRIPTION OF THE PREFERRED EMBODIMENTS

Referring to FIG. 1, the preferred embodiment of the subject optical waveguide connector 10 is shown to comprise two identical and intermateable hermaphroditic connector units 12, 14, and each connector unit generally comprises a body member 16, a clamping member 18, and a strain relief member 20 suitably formed from substantially rigid material. Specifically referring to connector unit 12, but applying equally to hermaphroditic connector unit 14, each body member 16 provides a base 22 having a top surface 24 extending from a rearward end 26 to a forward end 28, and having an integrally formed recess 30 formed therein intermediate the ends 26, 28; the recess 30 communicating with a sidewall 32 for a purpose to be explained below. Further provided in the body member 16 is a beveled locking shoulder 34 and locking recess 36 disposed forwardly and into the sidewall 32.

Continuing, integral to the top surface 24 and longitudinally extending therealong is an upper block portion 38 having an alignment arm 40 projecting forward beyond the forward end 28 of the base 22. An internal side of the alignment block portion 38 provides a first waveguide supporting surface 42 formed to define an angle with respect to a portion of the base top surface 24, said portion of surface 24 representing the second waveguide supporting surface of the connector unit. The block portion 38 further provides an intermediate diagonally recessed portion 44 intersecting a longitudinally undercut extension 46 of surface 42 which extends forward to a forward end of alignment arm 40. The extension 46 of surface 42 and the forward portion of the second waveguide supporting top surface 24, represent the two alignment surfaces of the connector unit.

Continuing, the alignment arm 40 as shown in FIG. 1 has an inwardly directed first camming surface 48, a forward beveled nose portion 50, and an outwardly directed nose surface 51, and a second angled camming surface 52. As particularly illustrated by the view of connector unit 14 in FIG. 1, a locking shoulder 53 and a locking detent 54 are formed in the alignment arm 40, and a locking detent 56 and locking shoulder 57 are formed in the base 22 transversely opposite the locking detent 36.

With continuing reference to FIG. 1, each body member 16 of the connector units 12, 14 includes a throughslot 58 in a rearward side 59 of the base 22 and communicating with the recess 30, and a lower alignment arm 60 extending forwardly from the base 22 parallel with and spaced apart from the upper alignment arm 40. The lower alignment arm 60, similarly to upper arm 40, has an inwardly chamfered nose portion 62. Each body member 16 is further provided with a waveguide supporting portion 64 having a narrow center section 66 which is adapted to provide an upper ridged surface 67 extending transversely thereacross. The ridged surface 67 is recessed below the plane of the top surface 24 of the base 22 a specified distance as explained in greater detail below.

The clamping member 18 provided each connector unit 12, 14 comprises a body portion 68 having a cantilever spring arm 70 forwardly extending therefrom. The cantilever arm 70 has an inwardly directed projection 72 at the forward end thereof, and includes an inwardly facing camming surface 74 formed at a prescribed angle for a purpose to be described below and having a locking surface 76. The clamping member 18 further includes a longitudinal third waveguide supporting surface 78 at the end thereof. A cantilevered tab portion 80 is provided having an inwardly directed locking lip 82 at a remote end thereof.

The third major member of each connector unit 12, 14, the strain relief member 20, is shown in FIG. 1 as comprising a generally U-shaped body having two legs 84, 86, depending from a central portion 88, and having inwardly directed flanges 90, 92, at the remote end of depending legs 84, 86 respectively. The central portion 88 has a downwardly facing surface 94 spanning the depending legs 84, 86 with the surface 94 further having a transverse groove 96 intermediately positioned therein.

Referring now to FIG. 2, each connector unit 12, 14 (only one of which being shown in FIG. 2) is intended to be used in conjunction with a substantially U-shaped waveguide end-positioning guage 98 comprising as intermediate portion 100 spanning two parallel projecting leg members 102, 104. Each of the leg members 102, 104 has an inwardly directed projection 106, 108, respectively at the distal end thereof. The intermediate portion 100 further presents an inwardly facing planar reference surface 110 having a specified configuration, and the intermediate portion 100 provides opposite side-molded grooves 112, 114 which facilitate easy manual gripping of the guage 98.

With continuing reference to FIG. 2, the assembly of the subject optic waveguide connector procedes as follows. Each connector unit is intended to precisely control and locate an optic waveguide 116 having jacket means 118 which has been removed to expose a waveguide portion of prescribed length. For purposes of reference, the unjacketed waveguide portion comprises an anterior section 120 proximate a waveguide prepared end surface 122, and a posterior section 124. As shown, to initiate the assembly procedure the waveguide 116 is positioned upon the surface 24 with the posterior section 124 loosely nested between the first waveguide supporting surface 42 and the second waveguide supporting top surface 24. So positioned, the anterior waveguide section projects forward exposed along an axial length thereof and is laterally supported by the undercut extension 46 of surface 42, and the forward portion of the second waveguide supporting top surface 24. The waveguide jacket is longitudinally positioned on the grooved surface 67 and it will be appreciated that the distance of recession between the grooved surface 67 and the top surface 24 generally corresponds to the diameter of the waveguide jacket 118.

The waveguide guage 98, clamping member 16, and strain relief member 18 are shown by FIG. 2 in positions prior to respective assembly to the body member 16.

As specifically illustrated by FIG. 3, the guage 98 is moved into a position between alignment arms 40, 60 with the leg members 102, 104 on opposite sides of the base 22. The guage is then fully inserted into referencing position with the reference surface 110 abutting the forward end 28 of the base 22, and the flanges 106, 108 of resilient legs 102, 104 entering into the first and second detents 36, 56 respectively to detachably lock the guage 98 and the base 22 together. It should be noted from FIGS. 2 and 3 that the reference surface 110 has a shaped configuration such that it provides a stop against which the forward end surface 122 of the waveguide 116 can be positioned with waveguide end 122 in abutting fashion. It will readily be appreciated that while the end surface 28 is represented to be coplanar with waveguide end 122, it is within the contemplation of the invention that the end surface 28 may be provided with an intermediate recess corresponding to a projection on the reference surface 110. The waveguide end surface 122 can then be referenced back from end 28 any desired distance to achieve an optimal gap between the waveguide end surfaces when the connector units are mated.

Viewing FIGS. 2 and 4, the assembly of the connector unit continues as follows. The clamping member 18 is laterally motivated into mounting engagement with the base 22 by appropriate alignment of the tab portion 80 within the recess 30. Further lateral movement of the clamping member 18 influences the third waveguide supporting surface 78 into longitudinal engagement with the waveguide posterior section 124, which is thereby wedged between the first waveguide supporting surface 42, the second waveguide supporting top surface 24, and the third waveguide supporting surface 78. The locking lip 82, as a result of the lateral movement of clamping member 18, emerges through the slot 58 and springs into abutting engagement with an upper edge defining the slot 58 to detachably hold the third supporting surface 78 against the waveguide section 124. FIG. 8 is presented to illustrate in section the clamping of the waveguide posterior section 124 by the laterally urged third waveguide supporting surface 78, the second waveguide supporting surface 24, and the first waveguide supporting surface 42, and to illustrate the emergence of the locking lip 82 through the slot 58 into engagement with the base 22. Urging the third supporting surface 78 towards the other two supporting surfaces 42, 24 causes the passageway defined between said surfaces to be one of variably reduced section which can accommodate a waveguide having a diameter variable within a specified range of tolerances. That is, to a limited extent, the passageway conforms to accommodate tolerance variation in the size of a given waveguide. After the waveguide has been clamped in the above described manner, the guage 98 can be disengaged from the body member 16. The prepared waveguide end surface 122 as a result is fixedly clamped in fixed relationship with the end 28 of the base 22 and can thereafter be located by reference to said end.

To complete the assembly of a connector unit, the strain relief member 20 is lowered onto the rearward portion 64 of the body member 16 with depending legs 84, 86 straddling the narrow section 66, and the waveguide jacket 118 axially aligned beneath the groove 96. The waveguide jacket is impressed against the ridged surface 67 as flanges 90, 92 snap beneath the lower edges of the narrow section 66, and the forward unbuffered section of the waveguide is thereby mechanically insulated from lateral or tensile manipulations exerted on the waveguide cable.

The connector unit completely assembled is illustrated by FIG. 4, and it should be appreciated that while only one connector unit is shown in FIG. 4, the other connector unit is identically assembled in the manner set forth above and from parts identical to those described. The mating of two identical connector units, illustrated by FIGS. 5 and 6, but also with reference to FIG. 1, is initiated by axially bringing two connector units into initial misaligned engagement, with the angled camming surface 74 of one connector unit's clamping member 18 slideably engaging the other connector section's nose surface 51, and with each connector unit's first camming surface 48 in slideable engagement with the other connector unit's first camming surface 48. Since the connector units are initially misaligned, the waveguides 116 therethrough are likewise axially misaligned at this juncture in the mating procedure. As shown in FIG. 5A, each waveguide at this stage is contained in a generally oversized triangle which eliminates abrasion against any alignment surface of the other connector unit during mating engagement.

As previously recited, the camming surface 74 of the connector clamping members is angled to facilitate engagement with the correspondingly angled nose surface 51 of the opposite connector unit. As the two connector units are axially moved toward each other, the cantilever projections 72 ride the camming surfaces 52 into an outwardly flexed state which causes resilient spring forces to be normally exerted on the angled camming surfaces 52. These spring forces can be broken, vectorally speaking, into inward and downward components which serve to align the connectors in two dimensions. The lower alignment arms 60 at this point are in coplanar slideably engaged adjacent relationship which further contributes to overall alignment of the connector units in this initial axially misaligned relationship.

Subsequent to the above described positioning of the alignment arms 40 and cantilever arms 70 against appropriately provided camming surfaces 48, 52, respectively, and with the connector units in the initial misaligned and axially parallel configuration illustrated by FIG. 5, further relative axial movement of the connector units together is effected to bring the forward portion of each alignment arm 40 into interfitting relationship into the provided recess 44 of the opposing connector unit. Such an interfitting relationship is achieved in controlled fashion as a result of the camming action between appropriately engaged camming surfaces. As illustrated in phantom by FIG. 6, in the fully mated state, the forward ends 28 of the connector units are in longitudinal abutment, the forward projection 72 of each cantilever arm 70 has cammed into a respective detent 54, and locking shoulders 53 and 76 engage to detachably hold the connector units together and to exert a residual spring force on the respective alignment arm 40.

Viewing FIG. 7 in conjunction with FIG. 6, it will be appreciated that as each forward projection 72 cams into a corresponding detent 54, the forward portion of each alignment arm 40 falls into an appropriate recess 44 of the opposite connector unit, and the undercut extension surface 46 of the alignment arm 40 peripherally engages and wedges the exposed anterior waveguide section 120 of the opposite connector unit against the surfaces 24, 46 of the opposite connector unit to thereby totally incapsulate and mechanically clamp the waveguide within its respective connector unit. It will be readily appreciated from FIGS. 2, 6 and 7 that the undercut extension 46, which is disposed beneath the recess 44, is smaller than the undercut portion of the extension 46 forward of the unit end 28. This enables the portion of extension 46 forward of end 28 of one connector unit to be urged closer to the recess 44, and closer to the recess portion of extension 46 of the other connector unit to achieve firm contact against the waveguide therebetween. Also, it should be noted that a given undercut extension 46 is common to both waveguides in the mated position. Having two surfaces common to both waveguides improves the optical alignment of their axis. The waveguides, so clamped and with the end surfaces 122 thereof referenced with respect to the forward ends 28 of the connector units, are aligned and held in axially coincident relationship with the gap between corresponding end surfaces 122 of the waveguides spaced to effect an optimal optical coupling. The resilient cantilever arms 70 exert a residual spring force against the angled camming surfaces 53 within the detents 54 which translates against the waveguide anterior section 120 by way of the undercut surfaces 46 engaged thereagainst. The downward and inward components of this spring force, previously described above, serves to wedge the waveguide section 120 down and against surfaces 46 and 24 of the opposing connector unit. This achieves a tight clamp on the forward end of the waveguide to more tightly control the critically referenced waveguide end surfaces and thereby enhance the optical alignment of the waveguides.

While the above description of the preferred embodiment exemplifies the principles of the subject invention, other embodiments which will be apparent to one skilled in the art and which utilize the teachings herein set forth are intended to be within the scope and spirit of the subject invention.

What is claimed is:

1. In a pair of connector bodies each having a corresponding optical waveguide secured thereto, said connector bodies being mateably engaged for colinearly aligning the axes of said waveguides, the improvement comprising:
    each connector body including first and second alignment surfaces which converge to define an interstitial space receiving a corresponding waveguide,
    each said first alignment surface extending beyond the end of a said corresponding waveguide to engage and laterally urge a corresponding waveguide of the other connector body into lateral engagement with the corresponding first and second converging surfaces of said other connector body when said connector bodies are matingly engaged; and
    each said first alignment surface cooperating with and converging toward the first alignment surface of the other connector body so that each said waveguide laterally engages both said first alignment surfaces.

2. A pair of connector bodies as set forth in claim 1, wherein each said connector body further comprises a third generally rearwardly disposed inwardly directed surface cooperating with rearward lengths of said first and second alignment surfaces to define a passageway therebetween for receiving the corresponding waveguide therethrough.

3. A pair of connector bodies as set forth in claim 1, wherein a forward end surface of each said corresponding waveguide is fixedly positioned in reference to a forward end of said second alignment surface.

4. A pair of connector bodies as set forth in claim 3, wherein said forward end surface of each said corresponding waveguide is fixedly referenced coplanar with a forward end of said second alignment surface by guaging means.

5. A pair of connector bodies as set forth in claim 3, wherein said forward end surface of each said corresponding waveguide is fixedly referenced a prescribed distance from a forward end of said second alignment surface by guaging means.

6. In a connector body of the type intended to have an optical waveguide secured thereto, and intended for mating engagement with a like connector body having another waveguide secured thereto to colinearly align the axes of said waveguides, the improvement comprising:
    first and second alignment surfaces which converge to define an interstitial space for receiving a corresponding waveguide,
    each said first alignment surface extending beyond the end of a said corresponding waveguide for engaging and laterally urging said other waveguide of said like connector body into lateral engagement with the corresponding first and second converging surfaces of said like connector body when said connector bodies are brought into mating engagement, and said first alignment surface cooperating with and converging toward the first alignment surface of said like connector body so that both said waveguide and said other waveguide laterally engage said first alignment surfaces of both said connector bodies when said bodies are in said mating engagement.

7. A connector for coupling optical waveguides in coincident axial alignment, comprising:
    two mateably engaged connector bodies, with each said connector body having three internally directed surfaces cooperating to define an elongate passageway therebetween for receiving an optic waveguide therethrough having a diameter variable within a range of tolerance limits, said passageway being of variable reduced section and each said connector body having means for urging one of said surfaces inwardly into circumferential engagement with said waveguide to clampingly wedge said waveguide between said three surfaces;
    two of said three surfaces of each said connector body extend forward respective distances from a forward end of the third surface to define therebetween an interstitial space open along an axial length thereof, and said two extending surfaces laterally supporting a forward length of the waveguide in said interstitial space;
    one of said two surfaces extending forward beyond a forward end of the other of said two extending surfaces for interfitting over the interstitial space and radially supporting the forward length of waveguide of the opposite connector body whereby said one of said two surfaces of each said connector body commonly engages said forward lengths of both said waveguides.

8. A connector for coupling optical waveguides in coincident axial alignment, comprising;
    two mateably engageable connector bodies with each said connector body having three inwardly directed surfaces cooperating to define an elongate passageway therebetween for receiving an optic waveguide therethrough having a diameter variable within a range of tolerance limits, said passageway being of variable reduced section and each said connector body having means for urging one of said surfaces inwardly into circumferential engagement with the waveguide to wedge the waveguide between said three surfaces;

two of said three surfaces of each connector body extend forward respective distances from a forward end of the third said surfaces to define therebetween an interstitial space open along an axial length thereof, and said two extending surfaces laterally supporting a forward length of the waveguide in said interstitial space, one of said two surfaces extending forward beyond a forward end of the other of said two extending surfaces for interfitting over the interstitial space and radially supporting the forward length of waveguide of said opposite connector body as said connector bodies are brought into said mating engagement, whereby both said one of said two surfaces commonly engage the forward length of both said waveguides with said connector bodies in said mating engagement.

9. A connector as set forth in claim 8 wherein the end surface of each waveguide is fixedly positioned in reference to a forward end of a respective said other surface with the forward ends of complimentary said other surfaces of opposing connector portions being in longitudinally adjacent relationship when said connector bodies are in aligned mating engagement.

10. A connector as set forth in claim 8, wherein each said connector body further comprising integral camming means disposed substantially forward of said forward end of said other surface for slideably engaging camming means of said opposite connector body as said bodies are axially moved together for bringing said surfaces and respective said complimentary surfaces into an initial misaligned relationship and, upon further axial movement of said connector bodies together, bringing said surfaces and said complimentary surfaces into a final coplanar relationship, whereby the waveguides through said connector bodies are in an axially misaligned relationship when said surfaces are in said misaligned relationship and, are in axially coincident relationship when said surfaces and complimentary surfaces are in said final coplanar relationship.

11. A connector as set forth in claim 8, wherein each said connector body further comprising means for urging said interfitting one of said two surfaces of said opposite connector body against the respective said forward length of waveguide of said connector body.

12. A method for aligning optical waveguides or the like, comprising the steps of:

orienting each waveguide between two converging elongate alignment surfaces of a respective connector body, one of said alignment surfaces extending forward beyond the forward end of the other said surface;

positioning a forward end surface of each said waveguide in a fixed referenced relationship with said forward end of said other surface;

clamping each said waveguide to fixedly hold said end surface in said fixed relationship;

interfitting said one alignment surface of one said connector body into longitudinal engagement over the waveguide of the other said connector body with said forward ends of said other surfaces of said connector bodies in adjacent coplanar relationship so that each said one alignment surface commonly engages both of said optical waveguides.

* * * * *